United States Patent
Hollingsworth (10) Patent No.: US 8,185,937 B2
(45) Date of Patent: *May 22, 2012

(54) SYSTEMS AND METHODS FOR UNIVERSAL PASSWORD CONTROL

(75) Inventor: John B. Hollingsworth, Covington, GA (US)

(73) Assignee: Worcester Technologies LLC, Wilmington, DE (US)

( * ) Notice: Subject to any disclaimer, the term of this patent is extended or adjusted under 35 U.S.C. 154(b) by 1238 days.

This patent is subject to a terminal disclaimer.

(21) Appl. No.: 11/692,867

(22) Filed: Mar. 28, 2007

(65) Prior Publication Data

US 2007/0169188 A1    Jul. 19, 2007

Related U.S. Application Data

(63) Continuation of application No. 10/233,618, filed on Sep. 4, 2002, now Pat. No. 7,200,864.

(51) Int. Cl.
*H04L 9/32* (2006.01)
*H04L 29/06* (2006.01)
*G06F 3/01* (2006.01)

(52) U.S. Cl. .................. 726/6; 726/8; 726/18

(58) Field of Classification Search .................. None
See application file for complete search history.

(56) References Cited

U.S. PATENT DOCUMENTS

| | | | |
|---|---|---|---|
| 5,768,503 A * | 6/1998 | Olkin | 726/5 |
| 5,892,828 A | 4/1999 | Perlman | |
| 6,243,816 B1 | 6/2001 | Fang et al. | |
| 7,016,875 B1 | 3/2006 | Steele et al. | |
| 7,441,263 B1 * | 10/2008 | Bakshi et al. | 726/2 |
| 2002/0078386 A1 | 6/2002 | Bones et al. | |
| 2003/0145237 A1 * | 7/2003 | Chang et al. | 713/202 |
| 2004/0044896 A1 * | 3/2004 | Kelley et al. | 713/183 |

* cited by examiner

*Primary Examiner* — Christopher Revak
(74) *Attorney, Agent, or Firm* — Turocy & Watson, LLP (57) ABSTRACT

A system and method is described for controlling the password(s) of one or more programs through a universal program. The universal control program allows access to one or more other programs and allows editing of the passwords of the other programs directly through the universal access program.

20 Claims, 5 Drawing Sheets

SYSTEMS AND METHODS FOR UNIVERSAL PASSWORD CONTROL

RELATED CASES

The present application is a continuation of U.S. patent application Ser. No. 10/233,618, entitled SYSTEMS AND METHODS FOR UNIVERSAL PASSWORD CONTROL, filed on Sep. 4, 2002, now issued as U.S. Pat. No. 7,200,864, and is hereby incorporated by reference.

BACKGROUND

1. Field of the Invention

The present invention relates to systems and methods for controlling passwords for multiple applications from at least a single source.

2. Background of the Invention

Time has become an increasingly precious commodity in today's society. Businesses are continuously devising new methods to decrease idle time for routine activities. Such routine activities may include, for example, repetitive procedures that may be a necessary but time-consuming part of a typical business day. One such repetitive activity is updating passwords for system software and programs.

Computer system users typically have to remember a number of passwords for various programs. Each password usually allows the user access to a specific software program or series of software programs. In certain instances, a specific firewall password may allow access to login sequences for a series of subsequent programs, each subsequent program requiring its own password to operate. In such cases, many passwords are needed and the user may be inundated with having to remember a series of typically alphanumeric passwords.

This requirement not only tests the memory of a user, but also requires an unnecessary and excessive amount of time to go through the access routine. Furthermore, more time is wasted when the passwords for each of the programs needs periodic updates. Finally, if the user forgets one or more passwords, a system operator may need to be consulted to reset the password or re-initialize the routine. Thus, more time is needed to deal with the password issues. Therefore, there is a need to provide a user with a single universal system or method of controlling multiple passwords for multiple programs.

SUMMARY OF THE INVENTION

The present invention may be used as a way to decrease time required to change, maintain, update, or control passwords for multiple programs from a given source platform. For example, a single control program could control the passwords of a number of programs that are accessible to the control program. The control program would enable a user to change, modify, delete, or otherwise edit the passwords of other software programs in electronic communication with the control program.

In an embodiment, such a control program can minimize the time required for editing or changing the passwords of multiple programs. Furthermore, the control program would decrease the need to memorize multiple passwords by electronically storing the passwords for the user. Finally, the control program could enable a user to instantly change all passwords of all programs in electronic communication with the control program by a few simple operations instead of having to access, log in, and change the password for each program individually.

As defined herein and through the written disclosure, a "program" encompasses a routine that performs a particular function by generally receiving a given input and producing a corresponding output. The program may be a specific software routine, or part of a routine and considered a "subroutine" of the software routine. The program may further be an access means, such that a user must successfully be allowed to log into the program in order to access a series of commands that are contained within the program. The program, as defined herein, is not limited to the examples set forth herein and may be any routine that may be separable and operate independently of other routines.

An exemplary embodiment of the present invention is a system for accessing multiple programs. The system includes a central program capable of automatically accessing other secondary programs, a control unit in communication with the central program, wherein the control unit allows controls of which secondary programs to access, and wherein the control unit allows control of password access to the secondary programs.

Another exemplary implementation of the present invention is a system for accessing multiple programs. The system includes means for automatically accessing multiple programs, means for controlling in communication with the means for accessing, wherein the means for controlling allows control of which programs to access, and wherein the means for controlling allows control of password access to the multiple programs.

Yet another exemplary embodiment of the present invention is method for editing a password of a program through a central control program. The method includes accessing the central control program, selecting program for which to edit the password, and editing the password for the selected program through the control program.

DETAILED DESCRIPTION OF PREFERRED EMBODIMENTS

An exemplary system and method of the present invention includes a universal program that is in communication with one or more password-accessed programs, routines, or subroutines. The universal program enables a user to control passwords of one or more programs that are in communication with the universal program.

Figure 1:
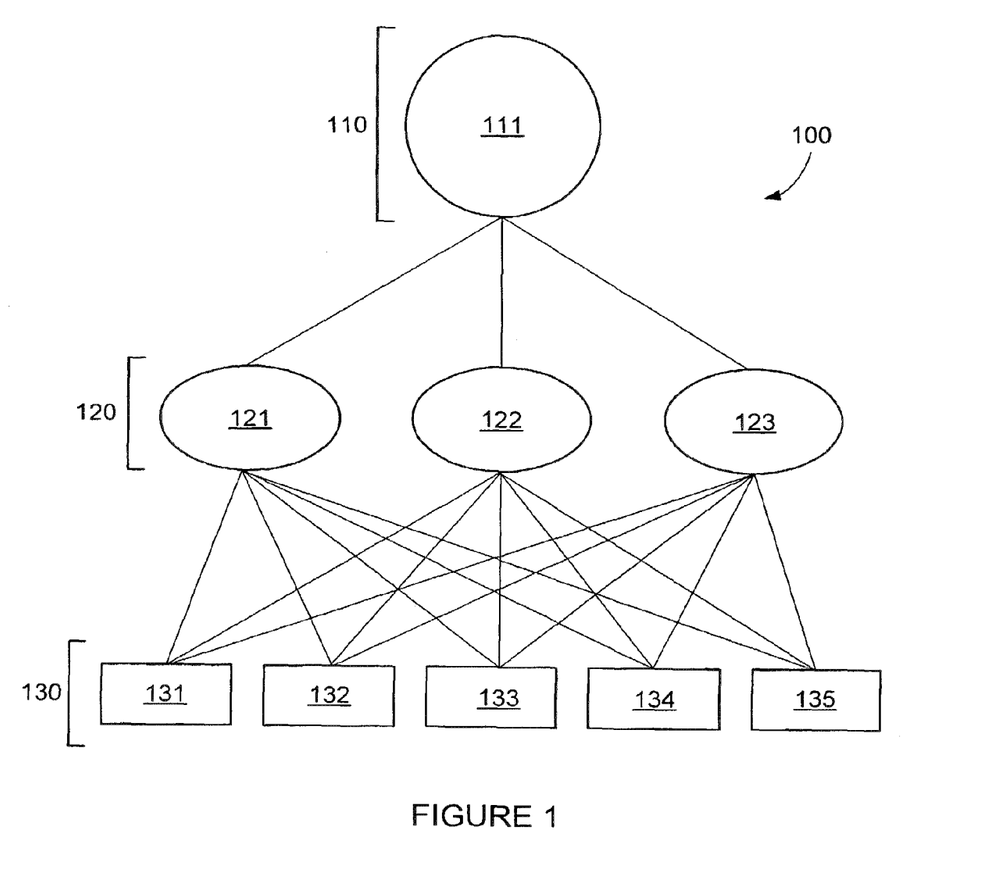
FIG. 1 shows an exemplary embodiment of a system architecture that requires a series of passwords to access different tiers of programs.

FIG. 1 shows an exemplary embodiment of a system 100 for accessing and communicating with multiple programs. The exemplary multi-tiered architecture shown in FIG. 1 has three tiers or levels of access for sake of simplicity, although any number of tiers, number of programs, or combinations of program hierarchy is possible.

In the first tier 110, a single program 111 is accessed through a specific password. Such a program 111 may allow a user access to the program once the proper password is accepted. Further, the program 111 allows access to another series of programs in a second tier 120. The second tier 120 includes exemplary secondary programs 121, 122, and 123. Each such program 121, 122, and 123 is further accessed through its own specific required password. Further, the program 111 in the first tier may have to be re-programmed with the passwords of each of the programs 121, 122, and 123 in the second tier 120 to enable the program 111 to access each of the programs 121, 122, and 123 automatically.

A third tier 130 of tertiary programs may exist including a series of programs 131, 132, 133, 134, and 135. Each such program in the third tier 130 requires its own password before the program may be accessed. Each of the passwords for each program in the third tier 130 may have to be then programmed into each of the programs in the second tier 120 so that the latter programs may access the former programs.

In the exemplary functional architectural structure shown in FIG. 1, a user may have to enter or update up to 27 different passwords to allow program 111 in the first tier 110 to control all programs in exemplary subsequent tiers 120 and 130. The user would have to enter five passwords for the five programs 131, 132, 133, 134, and 135. Then the user would have to enter each of the individualized passwords of programs 131, 132, 133, 134, and 135 into each of programs 121, 122, and 123 in the second tier 120. The user would also have to enter a unique password to access each of the programs 121, 122, and 123 in the second tier 120. The user would have to enter each such unique password of each program 121, 122, and 123 in second tier 120 into program 111. Finally, the user would enter a password to access program 111.

Thus, up to 27 total passwords must be entered or memorized by the user. Furthermore, if each such program in each of the three tiers 110, 120, and 130 has a requirement that its password be updated periodically, the same arduous process must be repeated. For example, if each program has a requirement to update its password every 60 days, the 27 password update process must be repeated within every 60 days. This process is time-consuming and tedious, and therefore potentially unpleasant for the user. If the user does not update the passwords within the 60 day period and/or forgets a single password, a system manager may have to be consulted to reset part or the entire password system. Thus, the user would be dependent on the system manager if the user forgets a password or fails to update the passwords in a timely fashion. This process is both timely and expensive for both the user and the system manager.

Thus, because the process of updating multiple passwords on a regular basis is so time consuming, there is a need for a new system that streamlines the password control process such that the user will not have to spend inordinate amounts of time for setting, updating, or controlling passwords for various programs in communication with a central control program.

Figure 2:
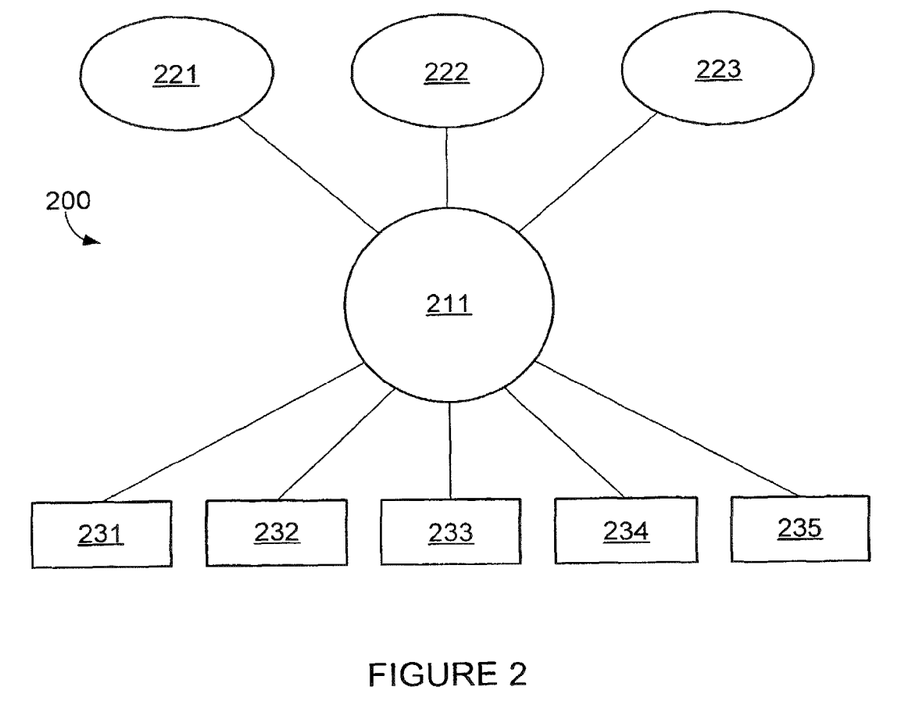
FIG. 2 shows an exemplary embodiment of the present invention as a single universal control program having control over the passwords of multiple programs.

An exemplary embodiment of the present invention is shown in FIG. 2 as system 200 for controlling multiple passwords in multiple programs from a universal control program. In this exemplary system 200, a single central control program 211 enables the user to access, control, or update passwords for various programs in communication with it.

As shown in the system 200 of FIG. 2, central program 211 is in communication and interaction with a series of programs 221, 222, 223, 231, 232, 233, 234, and 235. In this example, the series of programs 221, 222, and 223 are hierarchical and use the series of programs 231, 232, 233, 234, and 235 as sub-programs. For example, programs 231, 232, 233, 234, and 235 have a sub-program relationship to programs 221, 222, and 223 in a similar manner as programs 131, 132, 133, 134, and 135 have with programs 121, 122, and 123, respectively. Because central program 211 has access to each of the programs 221, 222, 223, 231, 232, 233, 234, and 235, the passwords of each of the latter programs may be changed by the program 211. Furthermore, since central program 211 has communication with each program 221, 222, 223, 231, 232, 233, 234, and 235, the central program 211 makes it possible to edit the passwords of each of the programs without going through serial layers of password access. Although in the example shown in FIG. 2, one control program 211 is shown in communication with eight access programs, any number of control or access programs are possible, as long as each control program can access and control the password of one or more other programs.

Figure 3:
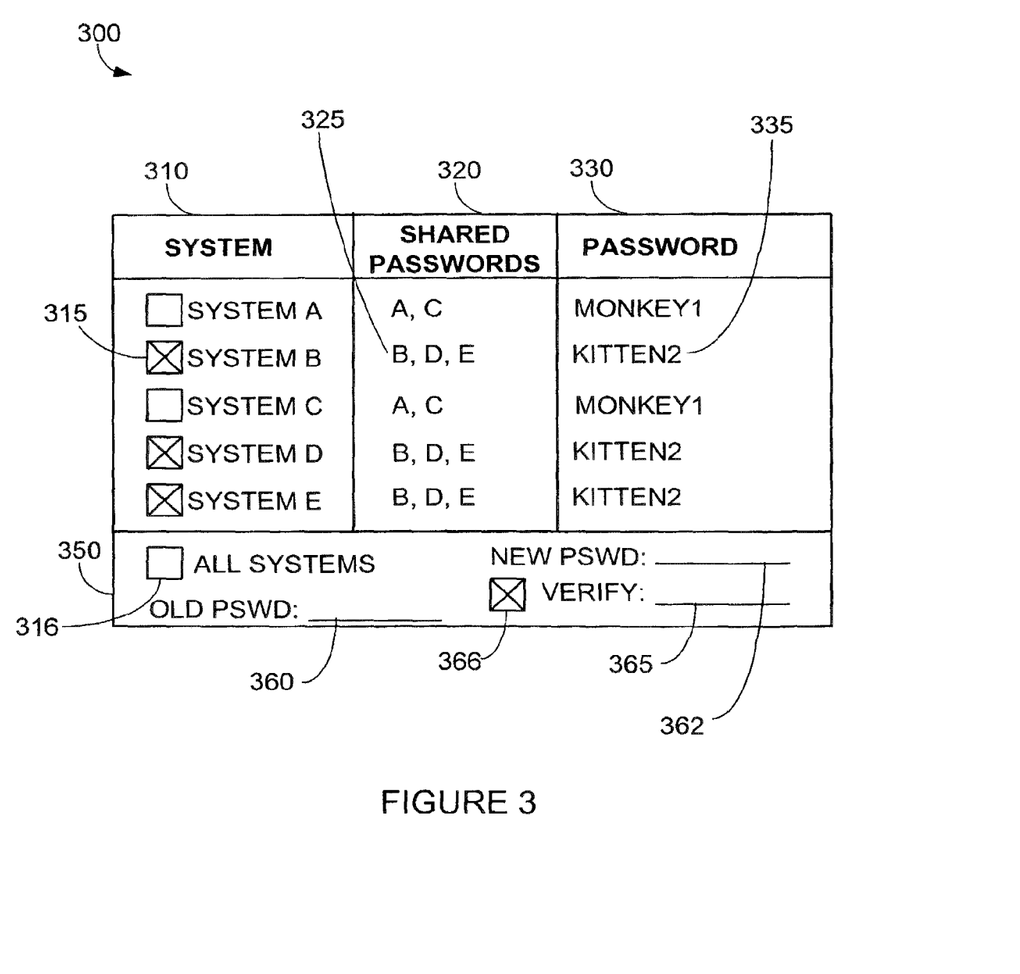
FIG. 3 shows a visual display according to an exemplary embodiment of the present invention with multiple choices of programs to control passwords.

An exemplary embodiment of a means to allow a user control over various program passwords through a control program is shown as system 300 in FIG. 3. Although the example shown is a visual display, such as, for example, a computer screen, wherein the user may choose various options, the invention is not limited to such a choosing means. For example, other choosing means for different programs may include keyboard, mouse, touch-sensitive screen, voice-activated commands, or the like.

In the example shown in FIG. 3, system 300 includes an exemplary computer display that includes a list 310 of programs that are accessible by the universal system. In the example shown, the system 300 has access to five programs, System A, System B, System C, System D, and System E. However, any number of programs may be accessed by system 300. For each of the listed programs in system column 310, an indicator box signals whether the particular program has been highlighted for an operation. For example, in the example shown in FIG. 3, the indicator box 315 for System B has been highlighted with an "X" to indicate that an operation is about to be performed on System B. Optionally, an all system indicator box 316 may be provided that allows an operation to be performed on all systems in system column 310.

For each of the programs listed in system column 310, a password may be added, changed or modified. In an operations field 350 of the system 300, old passwords may be changed to new passwords. For a given program that is highlighted by an indicator box as shown in column 310, the user may change the password by inputting the old password in area 360. The user also indicates a new password in area 362. Optionally, the new password may be re-entered in area 365. The verification process may be a part of the routine required to change or edit a password, and depends on whether indicator box 366 is highlighted with a marker, for example, an "X".

Optionally, for each given program listed in column 310, a column 320 indicates all programs 325 that utilize the same password. For example, the passwords for System B, D, and E are the same. Such a shared password grouping would be helpful, for example, if a group of programs are all somewhat dependent on each other. One such dependent condition is, for example, a hierarchical geometry, as shown in FIG. 1.

When two or more hierarchical programs are given the same password, it could allow a user to access all such programs in the architecture with the single password, thereby streamlining the accessing process.

Each of the passwords for the programs listed in column 310 may be displayed in a column 330 to serve as a convenient means for keeping track of various program passwords. For example, in the example of System B, the password is "KITTEN2", the same password that is also shared by System D and System E. Thus, there is less requirement for the user to remember various passwords for different programs and which programs may share particular passwords. Further, an indication of the actual password used for each related set of programs facilitates the interaction of such programs when needed, and decreases the necessity of remembering or keeping track of numerous passwords.

The above described exemplary system and method according to the present invention may be used in a variety of different manners and for a variety of different configurations. As long as there is a need to keep track of multiple passwords or there is a need to provide access to multiple layers of programs, the exemplary systems and methods according to the present invention could act as a means to decrease time required to log into each program separately, update each program separately, or have to remember multiple passwords. The exemplary systems and methods described herein may be applicable to, for example, telecommunications testing systems, utility companies, information technology testing systems, any business or personal computer systems, any portable computer systems, such as personal data assistants ("PDA") or the like, or any other system that could benefit from having a universal password control program.

Figure 4:
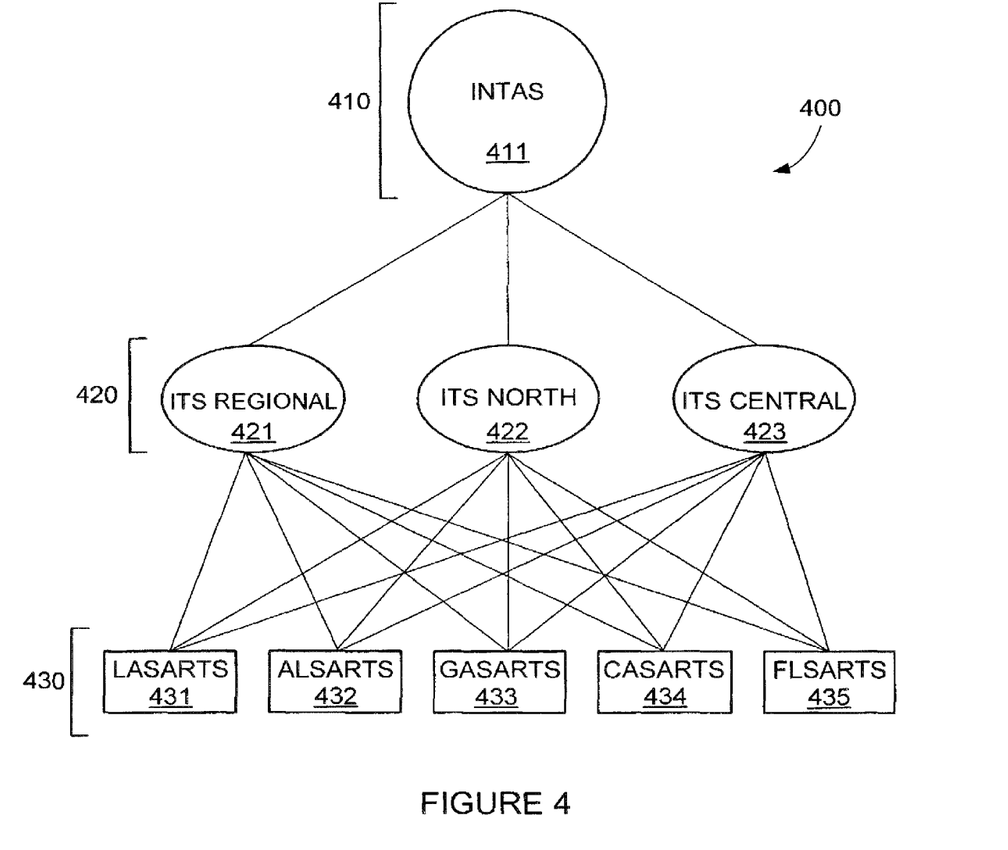
FIG. 4 shows an exemplary embodiment of a hierarchical control system typically used in a telephony-related system testing architecture.

One particular example of a system that requires a user to spend excessive amounts of time updating and controlling passwords individually per program is shown as testing system 400 in FIG. 4. Test system 400 may be used, for example, for testing telecommunication lines at various regions throughout the United States.

As presented in the example, various regional testing centers are separated by localized geography and labeled as 431, 432, 433, 434, and 435. Each such test center 431, 432, 433, 434, and 435 is designed to test the telecommunication lines of specific regions, such as Louisiana, Alabama, Georgia, Carolinas, and Florida, respectively. For example, upon receipt of a notice that a certain telecommunication test line in Georgia is not operating properly at a proper speed, a technician would specifically log into the test program 433, labeled as GASARTS, the test line system in Georgia. SARTS stands for "Switched Access Remote Test System".

The GASARTS test program 433 may be designed to test only certain telecommunication lines, but not all. For example, the SARTS test programs in the third tier 430 of testing programs may only be designed to test telecommunication lines that have speed capacities of less than 56K. Thus, although the technician may be able to access the specific test program 431, 432, 433, 434, or 435 in the third tier 430 category to determine whether a particular test line is functioning properly, the test line to be tested is limited to what the capacity of the SARTS system testing allows. For example, if the telecommunication line to be tested has a speed rate greater than 56K, none of the SARTS test programs 431, 432, 433, 434, or 435 may be used to determine the telecommunication line's proper information relaying properties.

No matter which of the programs in the third tier 430 the technician has to access, he or she will need to have password access to the program. Such password access is necessary for each of the five exemplary test programs shown in the third tier 430. Thus, the technician will have to potentially memorize a total of five passwords to be able to access any of the third tier programs 430 when such testing of the underlying communication lines is required.

If there is some indication that a telecommunication line greater than 56K speed may be having trouble relaying information, then none of the test programs in the third tier 430 may be used to test the lines. Thus, a second tier of programs 420 have to be accessed to test the higher speed telecommunication lines. The programs in the second tier 420 cover larger geographic areas than the programs in the third tier 430. Thus, fewer programs are available in the second tier 420. In the example shown in FIG. 4, three programs are presented as 421, 422, and 423 to represent the regional, north, and central geographical areas covered by the programs. ITS stands for integrated testing system.

The ITS systems in programs 421, 422, and 423 enable a technician to access higher speed telecommunication lines (for example, higher than 56K speed). However, the ITS systems also have the ability to test systems less than 56K speed. In order to access particular test lines in various regions, the ITS test programs 421, 422, and 423 may have to access particular SARTS programs 431, 432, 433, 434, and 435 in a given SARTS localized region. Moreover, to access the particular SARTS sub-program 431, 432, 433, 434, or 435, ITS program 421, 422, or 423 requires the password of the particular SARTS sub-program. Thus, each of the three exemplary programs 421, 422, 423 in the second tier 420 should be input with each of the five passwords of the sub-programs 431, 432, 433, 434, and 435 in communication with them.

Hence, a user, such as, for example, a technician, not only must keep track of each of the passwords for each program 421, 422, 423, 431, 432, 433, 434, and 435, but must also update each of the second tier ITS programs 420 with each of the five passwords of the third tier programs 430 to allow the ITS programs to access the SARTS programs. This accounts to a total of 23 password changes or updates. When taking into account a system requirement to periodically change to a new password in, for example, every sixty days, this sums up to a total of 138 password updates every year.

Adding another layer of authorization, a control program 411 in a first tier 410 has authority to control the program for any ITS program 421, 422, or 423 in the second tier 420. The first tier program 411 is labeled INTAS, which stands for "Integrated Testing and Analysis System". INTAS program 411 has its own password access system to enable authorized users to access the program. Furthermore, INTAS program 411 permits access of any communication line of any speed, thus having the ability of both third tier SARTS programs 430 and second tier ITS programs 420.

Under certain conditions, INTAS program 411 will have to access a particular test line that is under the control of a specific SARTS program, such as, for example, FLSARTS 435 in Florida. When such a requirement is made, INTAS program 411 will have to access the proper ITS program, which in this example is ITS Central program 423. To access ITS Central program 423, INTAS needs to have the password for the program 423. Thus, INTAS program 411 should have accurate information regarding the password of ITS programs 421, 422, and 423 in the second tier 420. So INTAS program 411 accesses ITS Central 423, which in turn accesses FLSARTS 435, allowing INTAS program 411 access to a particular telecommunication test line. Thus, in this example, INTAS program 411 is accessed through its own password, which in turn accesses ITS Central 423 through an accurate stored password in INTAS 411, and which ITS Central 423 accesses FLSARTS 435 through an accurate stored password in ITS Central 423. Several passwords are needed to test a particular telecommunication test line. This process may be slowed down by inaccurate passwords or a breakdown between the particular programs that must be accessed to finally reach the proper telecommunication test line. Thus, the system has drawbacks and shortcomings that make it inefficient and time-consuming.

Figure 5:
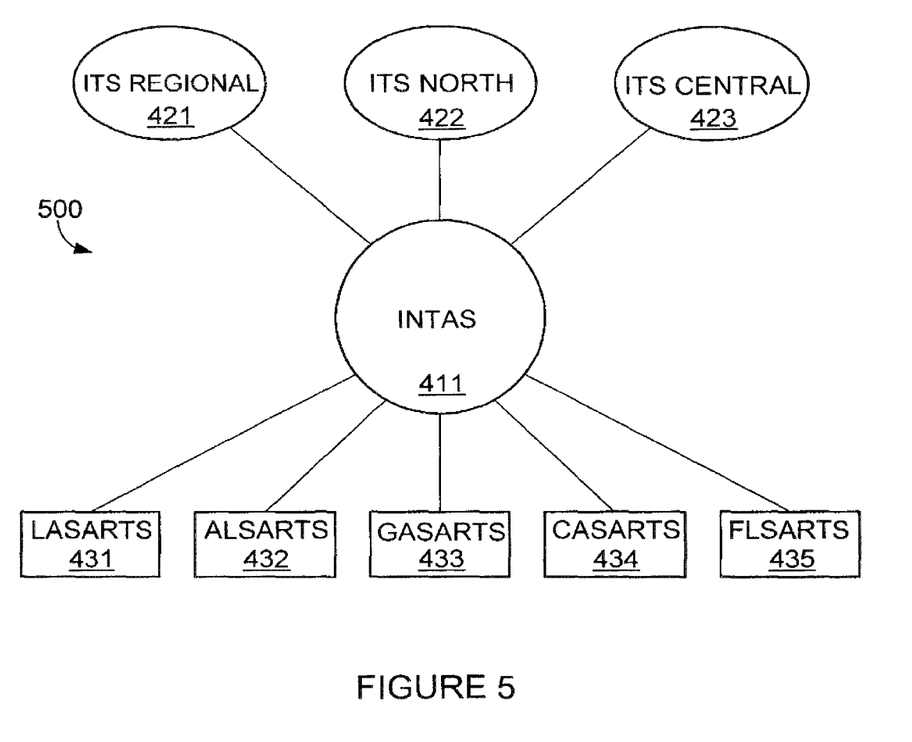
FIG. 5 shows an exemplary embodiment of a system according to the present invention that provides an alternative to the hierarchical password structure of the system shown in FIG. 4.

FIG. 5 shows a system 500 as an exemplary embodiment according to the present invention designed to present a more streamlined and efficient solution to the problems encountered in the system 400 described in FIG. 4. The system 500 can include the same programs in the first tier 410, second tier 420, and third tier 430 as shown in FIG. 4. However, the programs are arranged differently in the new system 500.

This new arrangement and access between programs as shown in FIG. 5 allows for more efficient operation. Furthermore, it allows a single program to update and access any of a variety of different subprograms directly, without having to utilize intermediary programs. Thus the new arrangement and architecture of programs requires less time to update passwords in various subprograms, thereby saving time and increasing accuracy of password storage between related programs.

In the exemplary system 500 shown in FIG. 5, INTAS program 411 has direct access to each of the ITS programs 421, 422, and 423, and each of the SARTS programs, 431, 432, 433, 434, and 435. Such direct access and communication between INTAS 411 and any of the sub-programs 421, 422, 423, 431, 432, 433, 434, and 435 eliminates the need for intermediary programs and therefore eliminates the need for intermediary programs to store accurate password information for the desired terminal programs.

For example, as described in the example described above with respect to the system 400 in FIG. 4 above, the system 500 would eliminate the requirement for ITS Central 423 to store accurate and updated password information for FLSARTS 435 in order for INTAS 411 to access FLSARTS 435 to test a communication line under control of FLSARTS 435. Under the new exemplary system 500, INTAS 411 would access FLSARTS 435 directly, as shown in FIG. 5. INTAS 411 could not only access each of the subprograms directly, as shown in FIG. 5, but also update, change, edit, or delete the passwords of each of these subprograms. A method of changing such passwords in the subprograms is described in the example above with respect to FIG. 3. Other means of changing or updating passwords are possible.

A given technical personnel may only be authorized to access certain levels of programs 421, 422, 423, 431, 432, 433, 434, or 435, and so the personnel's password may not provide access to any other program other than the one(s) that are pre-authorized. Thus, this given personnel may have an INTAS program 411 that allows access to select subprograms, such as, for example, only SARTS programs 434 and 435. This flexibility may be established by a system manager that presents this personnel with a limited access INTAS program 411 that is only allowed access to select ITS and SARTS programs. Different level personnel may then be presented with a main access program 411 that has access to programs that are only within the authorization limit of the specific personnel. Thus, personnel may only access, edit, and change the passwords of those programs that have already been preauthorized for them.

One of the advantages of the methods and systems of this invention is the minimization of time that a user would have to spend accessing multiple programs. Furthermore, the user would save time by not having to enter the password individually for each of the programs being accessed. Also, the user may edit, change, or update the password of one or more programs from a single source used for storing multiple system passwords. The single source may be, for example, a universal access program that may or may not have its own password. Thus, the user, at most, would have to remember a single password to access the universal access program, and then this program would store the passwords of all secondary programs within communication with the central program. Also, the password would have the ability to change the password of all such secondary programs that are within communication with the universal program. Such secondary programs may need to have to be adjusted or edited to allow the universal program to access and change or otherwise edit the passwords of such secondary programs.

Because less time has to be spent changing, updating, or editing passwords in multiple programs, a user would benefit from the time saved by using a universal program that accesses the passwords of other programs in communication with it. Furthermore, the user would not have to remember more than a single password, if even that, for the universal control program, in order to access all programs. Thus, several advantages of the exemplary embodiments of the present invention described above include less time spent by a user in performing steps related to password updating, accessing, and otherwise, and also less requirement to memorize multiple passwords.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. A system comprising:
   a central program, on a computer, configured to access a plurality of secondary programs and a plurality of tertiary programs;
   a control unit, in connection with the central program, configured to control which of the plurality of secondary programs and which of the plurality of tertiary programs to access; and
   wherein the central program is configured to utilize the control unit to concurrently edit a plurality of passwords associated with the plurality of secondary programs and the plurality of tertiary programs.

2. The system of claim 1, wherein the control unit includes an option to indicate which programs share a same password.

3. The system of claim 1, wherein the central program, the plurality of secondary programs, and the plurality of tertiary programs are configured in a hierarchical structure whereby the central program controls the plurality of secondary programs and the plurality of tertiary programs and the plurality of secondary programs control the plurality of tertiary programs and the plurality of tertiary programs control the plurality of secondary programs or the central program.

4. The system of claim 1, wherein the plurality of tertiary programs, the plurality of secondary programs and the central program are accessed based on respective passwords.

5. The system of claim 4, wherein passwords for the plurality of tertiary programs are stored by the plurality of secondary programs to allow the plurality of secondary programs to access the plurality of tertiary programs.

6. The system of claim 4, wherein passwords for the plurality of secondary programs and the plurality of tertiary programs are stored by the central program to allow the central program to access the plurality of secondary programs and the plurality of tertiary programs.

7. The system of claim 1, wherein the plurality of passwords for the plurality of secondary programs are indicated.

8. A system, comprising:
means for accessing programs via a computer, the programs having passwords that are accessible by the means for accessing;
means for controlling, in communication with the means for accessing, which of the programs to access;
means for indicating the passwords for the programs; and
wherein the means for accessing utilizes the means for controlling to review and concurrently edit the passwords of the programs through the means for accessing.

9. The system of claim 8, further comprising first means for indicating, on the means for controlling, which programs share a same password.

10. The system of claim 9, further comprising second means for indicating, on the means for controlling, the passwords for the programs.

11. The system of claim 8, further comprising other means for indicating, on the means for controlling, the passwords for the programs.

12. The system of claim 8, further comprising selecting means for selecting at least two of the programs in connection with editing the passwords of the programs.

13. The system of claim 8, wherein the programs are configured according to a hierarchical structure whereby a central program controls one or more levels of subprograms defined according to the hierarchical structure.

14. The system of claim 13, wherein the one or more levels of subprograms controls a next level of programs, and a last level of subprograms controlled by a previous level of subprograms controls only the last level of subprograms.

15. A method, comprising:
receiving a log on command and password by a central control unit executing a central control program;
presenting a graphical interface, wherein the graphical interface includes a list of programs that are accessible by the central control unit;
receiving a selection of a secondary program and a tertiary program for which a password of the secondary program and a password of the tertiary program are to be edited; and
concurrently editing the password of the secondary program and the password of the tertiary program through the central control program.

16. The method of claim 15, further comprising:
accessing multiple secondary programs and multiple tertiary programs by the central control program.

17. The method of claim 16, wherein the editing includes editing passwords of the multiple secondary and tertiary programs by the central control program.

18. The method of claim 16, further comprising indicating which of the multiple secondary programs share a same password.

19. The method of claim 18, further comprising indicating passwords for the multiple secondary programs.

20. A computer-readable storage device comprising computer-executable instructions that, in response to execution, cause a computing system to perform operations, comprising:
accessing, by a central program, a plurality of secondary programs and a plurality of tertiary programs;
controlling, in cooperation with a control unit, which of the plurality of secondary programs and which of the plurality of tertiary programs to access; and
concurrently editing, by the central program in cooperation with the control unit, a plurality of passwords associated with the plurality of secondary programs and the plurality of tertiary programs.

* * * * *